(12) United States Patent
Gaynier et al.

(10) Patent No.: US 9,533,637 B2
(45) Date of Patent: Jan. 3, 2017

(54) SMART POWER OUTLET SYSTEM

(71) Applicants: John M Gaynier, Carleton, MI (US); Gary B Flaishans, Clarkston, MI (US); Alessandro Milite, Birmingham, MI (US)

(72) Inventors: John M Gaynier, Carleton, MI (US); Gary B Flaishans, Clarkston, MI (US); Alessandro Milite, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 546 days.

(21) Appl. No.: 14/058,766

(22) Filed: Oct. 21, 2013

(65) Prior Publication Data

US 2015/0108830 A1  Apr. 23, 2015

(51) Int. Cl.
*B60R 16/03* (2006.01)
*G06F 1/26* (2006.01)

(52) U.S. Cl.
CPC ............ *B60R 16/03* (2013.01); *G06F 1/26* (2013.01)

(58) Field of Classification Search
CPC ............ B60R 16/03; H02J 1/10; G06F 1/26
USPC .......................................................... 307/9.1
See application file for complete search history.

(56) References Cited

U.S. PATENT DOCUMENTS

| | | | | |
|---|---|---|---|---|
| 7,339,353 B1* | 3/2008 | Masias | .................. | H02J 1/10 320/138 |
| 7,812,476 B2* | 10/2010 | Menas | .................. | G06F 1/26 307/11 |
| 8,174,149 B2* | 5/2012 | Chapel | .............. | H01R 13/6683 307/64 |
| 2002/0180400 A1* | 12/2002 | George | ................. | B66D 3/18 318/727 |
| 2008/0098249 A1* | 4/2008 | Chu | ........................ | G06F 1/26 713/330 |
| 2009/0016216 A1* | 1/2009 | Ballard | ................. | B60R 16/03 370/230 |

\* cited by examiner

*Primary Examiner* — Jared Fureman
*Assistant Examiner* — James Evans
(74) *Attorney, Agent, or Firm* — Ralph E. Smith

(57) ABSTRACT

A smart power outlet system for a vehicle has a power outlet control module and a plurality of power outlets. Each power outlet has an associated set of power switching devices with each power switching device of a set of power switching devices coupled to a different power source. The power outlet control module drives a display and is responsive to user input via the display. The power outlet control module energizes one of the power switching devices in each set of power switching devices corresponding to a power source selected by a user via the display to provide power to the power outlet associated with that set of power switching devices from the power source selected by the user.

11 Claims, 2 Drawing Sheets

SMART POWER OUTLET SYSTEM

FIELD

The present invention relates to power outlets, particularly power outlets in automotive vehicles.

BACKGROUND

Automotive vehicles such as passenger cars and trucks have one or more power outlets. Devices requiring electrical power can be plugged into the outlet (or outlets) having the appropriate output characteristics. For example, a cell phone charger requiring 12 VDC can be plugged into a power outlet having 12 VDC electrical power. While 12 VDC is typical for power outlets in automotive vehicles, automotive vehicles can have additional power outlets having other output voltages, such as 120 VAC.

The power outlets are typically powered based on the state of the ignition switch (or its equivalent), which may differ depending on the power outlet. For example, a power outlet may be powered all the time, it may be powered when the ignition switch is in the "accessory" position, it may be powered when the ignition switch is in the "on" position regardless of whether the vehicle is running, or it may be powered when the ignition switch is in "on" position and the engine of the vehicle is running.

SUMMARY

In accordance with an aspect of the present disclosure, a smart power outlet system for a vehicle has a power outlet control module and a plurality of power outlets. Each power outlet has an associated set of power switching devices with each power switching device of a set of power switching devices coupled to a different power source. The power outlet control module drives a display and is responsive to user input via the display. The power outlet control module energizes one of the power switching devices in each set of power switching devices corresponding to a power source selected by a user via the display to provide power to the power outlet associated with that set of power switching devices from the power source selected by the user. In an aspect, each power outlet may have one or a plurality of plug receptacles.

In an aspect, each power outlet is coupled in series to its associated power switching devices through a resettable circuit protection device. The power outlet control module monitors the state of each resettable circuit protection device and displays on the display whether any of the resettable circuit protection devices is tripped.

In an aspect, the power outlet control module is responsive to a user command entered by a user on the display to reset any of the resettable circuit protection devices that have been tripped.

In an aspect, the power switching devices are relays. In an aspect, the relays are latching relays.

In an aspect, the power switching devices are high side drivers and when a power switching device is to be energized to couple one of the power outlets to a power source that is not a power source provided when an engine of the vehicle is on, the power outlet control module monitors whether a load is plugged into that power outlet and energizes that high side driver only when the load is plugged into that power outlet.

In an aspect, the power switching devices are high side drivers and the power outlet control module monitors current flowing through each high side driver that has been energized and de-energizes any such high side driver in the event that it experiences an overload condition.

In an aspect, the power outlet control module monitors the state of each power outlet and displays on the display whether a high side driver in the set of power switching devices associated with that power outlet has experienced an overload condition.

In an aspect, the power outlet control module is responsive to a user command entered by a user on the display to reset power to any power outlet having a high side driver in the set of power switching devices associated with that power outlet that experienced an overload condition.

In an aspect, the power sources include a battery of the vehicle, power provided when an ignition switch of the vehicle is in an accessory position and power provided when the ignition switch is in an on position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
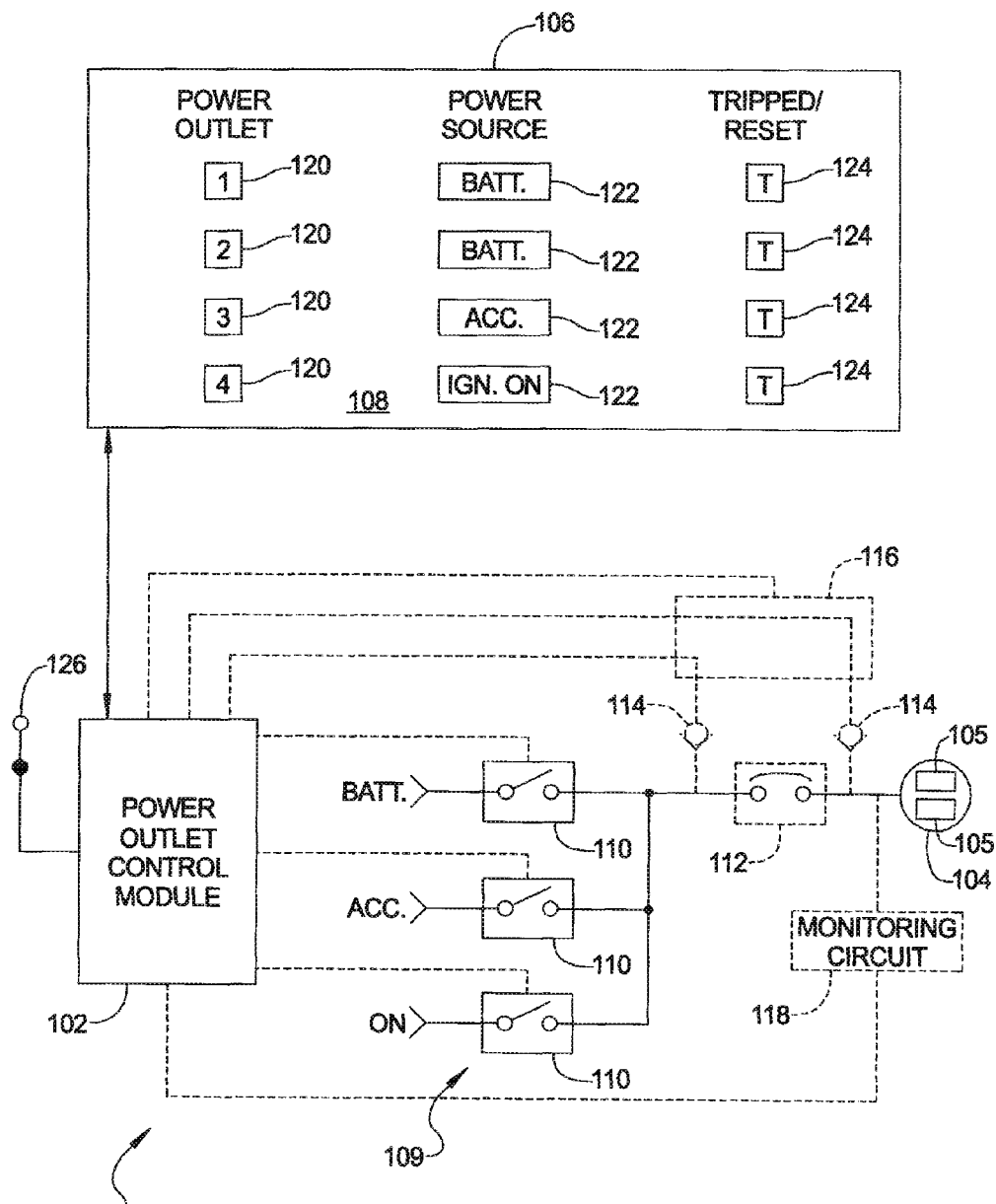
FIG. 1 is a simplified block diagram of a smart power outlet system in accordance with an aspect of the present disclosure.

FIG. 1 shows a block diagram of a smart power outlet system 100 in accordance with an aspect of the present disclosure. Smart power outlet system 100 includes a power outlet control module 102 coupled to one or more power outlets 104 and to a display 106. An occupant of a vehicle, such as the driver, is presented with a menu 108 on display 106 by the electronic power outlet control module 102 in the vehicle that drives the display 106. The display 106 may be part of the power outlet control module 102 or separate. The display 106 may also be part of another electronic module such as an instrument cluster, radio, information center, or the like. Power outlet control module 102 controls and monitors the power outlets 104. It should be understood that power outlet control module may in some cases only control a power outlet 104, only monitor a power outlet 104, or both control and monitor a power outlet 104.

Smart power outlet system 100 includes a plurality of sets 109 of power switching devices 110 through which the various power sources are switched to power outlet 104. The power sources are for example, the battery, power provided when the ignition switch is in its Accessory (Acc.) position, and power provided when the ignition switch is in its On position (On). While one power outlet 104 is shown in FIG. 1 with one set 109 of power switching devices 110, it is to be understood that smart power outlet system 100 can include a plurality of power outlets 104 with respective sets 109 of power switching devices 110 for each power outlet 104. It should be understood that each power outlet 104 may include one or a plurality of outlet receptacles 105, two such outlet receptacles being shown in FIG. 1. It should be understood that that the outlet receptacles 105 of a power outlet may be disposed together, such as in the same housing or separately. For example, the outlet receptacles of a power outlet may be disposed in different locations in the center console of a vehicle.

In an aspect, each power outlet 104 is protected by a circuit protection device 112 shown in phantom in FIG. 1 in series between the power outlet 104 and the power switching devices 110 for that power outlet 104. In an aspect, voltage sensors 114 shown in phantom in FIG. 1 are coupled to either side of circuit protection device 112 and to power outlet control module 102. Power outlet control module 102 monitors whether circuit protection device 112 is tripped or not based on the voltages sensed by voltage sensors 114. It should be understood that a monitoring circuit 116 shown in phantom in FIG. 1 could be coupled to voltage sensors 114 and to power outlet control module 102 and provide power outlet control module 102 a signal that indicates whether circuit protection device 112 is tripped or not. Monitoring circuit 116 may for example be a circuit that reads the voltages sensed by voltage sensors 114 and determines whether circuit protection device 112 is tripped or not based on the read voltages.

Power switching devices 110 may be relays or latching relays and circuit protection device 112 may be a resettable circuit protection device such as a resettable circuit breaker, and may be a positive temperature coefficient (PTC) circuit breaker. When circuit protection device 112 is a resettable circuit protection device, it may be may be coupled to power outlet control module 102 and resettable by it as discussed below.

In another aspect, power switching devices 110 may be high side drivers that may include current sensing and overload protection and provide a feedback signal to power outlet control module 102. Such a high side driver may be a PROFET™ smart high side switch available from Infineon Technologies. A shown in phantom in FIG. 1, a monitoring circuit 118 may be provided that monitors whether a load is plugged into power outlet 104.

The menu 108 on display 106 allows a vehicle occupant to select how one or more of the power outlets 104 in the vehicle are to be fed with power. For example, menu 108 may include elements such as power outlet selection icons 120 for each of the power outlet modules 104 that are controlled and/or monitored by power outlet control module 102. Menu 108 may also include elements such as power source selection icons 122 for each of the power outlets 104 having a selectable power source. Menu 108 may also include elements such as tripped/reset icons 124 for each power outlet 104 having a resettable circuit protection device 112. Menu 108 may also show locations of the power outlets 104 and plug receptacles 105 in the vehicle with the status of the power outlets, including how they are programmed (on, accessory or battery) and whether the power outlet 104 is functioning or overloaded, with an example discussed below with reference to FIG. 2. In an aspect, display 106 includes a touch screen.

In an aspect, a vehicle occupant can select via menu 108 which power outlet 104 to configure by selecting the power outlet selection icon 120 for that power outlet 104 which may then change the power source for that power outlet 104 to the next power source each time the power source selection icon 122 for that power outlet 104 is selected and the power source selection icon 122 also displaying the power source selected for that power outlet 104.

Figure 2:
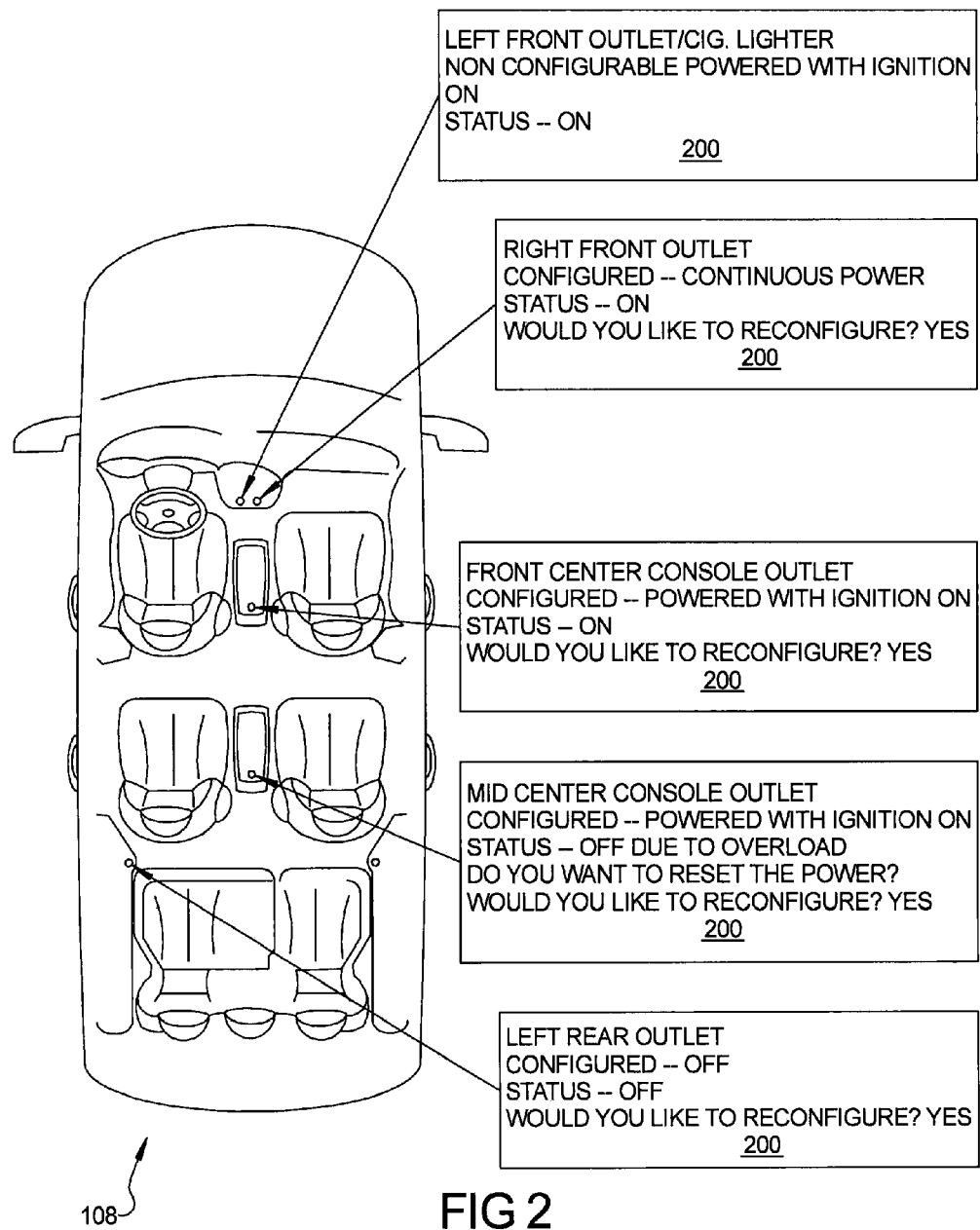
FIG. 2 is diagrammatic view of a menu shown on a display in the form of an outline of a vehicle showing the locations of the power outlets of the smart power outlet system of FIG. 1.

In an aspect, the menu 108 shown on display 106 may be in the form of a visual representation of a vehicle showing the locations of the power outlets 104 in the vehicle, as shown in FIG. 2 which shows an outline of a vehicle. It should be understood that the visual representation of the vehicle could be other than an outline of the vehicle. It could for example be an actual image of the vehicle or a graphical image of the vehicle. In an aspect of the embodiment shown in FIG. 2, the menu may display the status of each power outlet 104, which may be by text, an icon such as tripped/reset icon 124, a graphical indicator, or any combination thereof. For example, a power outlet 104 that is tripped (e.g., having its circuit protection device 112 tripped) may be shown in red and a power outlet 104 that is not tripped shown in green. In an aspect, a user select each power outlet 104 by touching the location for that power outlet 104 on menu 108 which will expand that location and display commands which the user can select to configure or reset the selected power outlet 104, as shown by blocks 200 in FIG. 2. In an aspect, power outlet control module may alert a user with an audible alert when a power outlet 104 is tripped as well as change the display on menu 108 for that power outlet 104 to indicate that it is tripped.

In an aspect, the power outlet control module 102 monitors one or more of the power outlets 104 and communicates with the display 106 to display status information about the power outlet or outlets 104. The power outlet control module 102 may monitor a power outlet 104 for a variety of status conditions. For example, the power outlet control module 102 may monitor the power outlet 104 via monitoring circuit 118 to determine if a load is plugged into it. The power outlet control module 102 may monitor the current being drawn by the power outlet 104. The power outlet control module may monitor the status of circuit protection device 112 via voltage sensors 114 or monitoring circuit 116.

In an aspect, the power outlet control module 102 monitors the state of the circuit protection device 112 to determine if it is tripped. When the circuit protection device 112 is tripped, the power outlet control module will communicate the tripped status to display 106 where the tripped/reset icon 124 for the power outlet 104 protected by that circuit protection device 112 is appropriately illuminated. For example, when the circuit protection device 112 is not tripped, the tripped/reset icon may be green and when it is tripped, it may be red. In an aspect, when the circuit protection device 112 is a resettable circuit protection device, a vehicle occupant can reset it such as by pressing the tripped/reset icon 124. In response to tripped/reset icon 124 being pressed, power outlet control module resets the resettable circuit protection device 112. Alternatively, appropriate software in the vehicle can reset the resettable circuit protection device 112, or the circuit protection device 112 may be the type that resets itself automatically when the fault condition has been corrected.

In an aspect, when power switching devices 110 are high side drivers and a power source other than a power source provided when the ignition is in the "On" position is selected, then power outlet control module 102 either turns on the high side driver for that power outlet 104 or where there is a monitoring circuit 118 associated with that power outlet 104, turns on the high side driver for that power outlet 104 when it determines via monitoring circuit 118 that a load is plugged into that power outlet 104. By only turning on the high side driver for the power outlet 104 when monitoring circuit 118 senses that a load is plugged into power outlet 104 the current draw needed to keep the high side driver energized is reduced as the high driver is only turned on when a load is plugged into the power outlet 104.

In aspect, when power switching devices 110 are high side drivers, power outlet control module 102 monitors each high side driver that is energized to determine if there is an overload condition. In the event that an energized high side driver is experiencing an overload condition, power outlet control module 102 turns that high side driver off. Power outlet control module 102 then displays on display 106 an indicator of the overload condition, such as turning the tripped/reset icon 124 to red. In an aspect, an occupant of the vehicle can reset the power via a command input via display 106 such as pressing tripped/reset icon 124. When power switching devices 110 are high side drivers, in one aspect circuit protection element 112 may be eliminated with the protection being provided by the power outlet control module 102 de-energizing a high side driver when the high side driver is experiencing an overload condition. Alternatively, circuit protection element 112 may be provided but with a higher trip point than the trip point at which the power outlet control module 102 de-energizes the high side driver when the high side driver is experiencing an overload condition.

It should be understood that power outlet control module 102 may be, be part of, or include an Application Specific Integrated Circuit (ASIC); an electronic circuit; a combinational logic circuit; a field programmable gate array (FPGA); a processor (shared, dedicated, or group) that executes code; a programmable logic controller, programmable control system such as a processor based control system including a computer based control system, a process controller such as a PID controller, or other suitable hardware components that provide the described functionality or provide the above functionality when programmed with software as described herein; or a combination of some or all of the above, such as in a system-on-chip. Power outlet control module 102 may be a discrete module or it may be implemented as part of an electronic control module in the vehicle such as an electronic control module commonly known as the body controller. The term module may include memory (shared, dedicated, or group) that stores code executed by the processor. The term software, as used above, may refer to computer programs, routines, functions, classes, and/or objects and may include firmware, and/or microcode.

The apparatuses and methods described herein may be implemented by software in one or more computer programs executed by one or more processors of one or more controllers. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A smart power outlet system for a vehicle, comprising:
   a power outlet control module;
   a plurality of power outlets, each power outlet having an associated set of power switching devices, each power switching device of a set of power switching devices coupled to a different power source;
   the power outlet control module driving a display and responsive to user input via the display;
   the power outlet control module energizing one of the power switching devices in each set of power switching devices corresponding to a power source selected by a user via the display to provide power to the power outlet associated with that set of power switching devices from the power source selected by the user; and
   wherein each power outlet is coupled in series to its associated power switching devices through a resettable circuit protection device, the power outlet control module monitoring the state of each resettable circuit protection device and displaying on the display whether any of the resettable circuit protection devices is tripped.

2. The smart power outlet system of claim 1 wherein the power outlet control module is responsive to a user command entered by a user on the display to reset any of the resettable circuit protection devices that have been tripped.

3. The smart power outlet system of claim 2 wherein the power switching devices are relays.

4. The smart power outlet system of claim 2 wherein the relays are latching relays.

5. A smart power outlet system for a vehicle, comprising:
   a power outlet control module;
   a plurality of power outlets, each power outlet having an associated set of power switching devices, each power switching device of a set of power switching devices coupled to a different power source;
   the power outlet control module driving a display and responsive to user input via the display;
   the power outlet control module energizing one of the power switching devices in each set of power switching devices corresponding to a power source selected by a user via the display to provide power to the power outlet associated with that set of power switching devices from the power source selected by the user; and
   wherein the power switching devices are high side drivers and when a power switching device is to be energized to couple one of the power outlets to a power source that is not a power source provided when an engine of the vehicle is on, the power outlet control module monitors whether a load is plugged into that power outlet and energizes that high side driver only when the load is plugged into that power outlet.

6. The smart power outlet system of claim 5 wherein the power outlet control module monitors the state of each power outlet and displays on the display whether a high side driver in the set of power switching devices associated with that power outlet has experienced an overload condition.

7. The smart power outlet system of claim 6 wherein the power outlet control module is responsive to a user command entered by a user on the display to reset power to any power outlet having a high side driver in the set of power switching devices associated with that power outlet that experienced an overload condition.

8. A smart power outlet system for a vehicle, comprising:
   a power outlet control module;
   a plurality of power outlets, each power outlet having an associated set of power switching devices, each power switching device of a set of power switching devices coupled to a different power source;
   the power outlet control module driving a display and responsive to user input via the display;
   the power outlet control module energizing one of the power switching devices in each set of power switching devices corresponding to a power source selected by a user via the display to provide power to the power outlet associated with that set of power switching devices from the power source selected by the user: and wherein the power switching devices are high side drivers and the power outlet control module monitoring current flowing through each high side driver that has been energized and de-energizing any such high side driver in the event that it experiences an overload condition.

9. A smart power outlet system for a vehicle, comprising:
a power outlet control module;
a plurality of power outlets, each power outlet having an associated set of power switching devices, each power switching device of a set of power switching devices coupled to a different power source;
the power outlet control module driving a display and responsive to user input via the display;
the power outlet control module energizing one of the power switching devices in each set of power switching devices corresponding to a power source selected by a user via the display to provide power to the power outlet associated with that set of power switching devices from the power source selected by the user; and
wherein the power sources include a battery of the vehicle, power provided when an ignition switch of the vehicle is in an accessory position and power provided when the ignition switch is in an on position.

10. A smart power outlet system for a vehicle, comprising:
a power outlet control module;
a plurality of power outlets, each power outlet having an associated set of power switching devices, each power switching device of a set of power switching devices coupled to a different power source;
the power outlet control module driving a display and responsive to user input via the display;
the power outlet control module energizing one of the power switching devices in each set of power switching devices corresponding to a power source selected by a user via the display to provide power to the power outlet associated with that set of power switching devices from the power source selected by the user; and
wherein the power outlet control module displays on the display a menu in the form of a visual representation of a vehicle showing a location of each power outlet in the vehicle.

11. The smart power outlet of claim 10 wherein a user can select each power outlet by touching its location on the menu and the power outlet control module then displays commands on the vehicle by which the user can select to reconfigure or reset that power outlet control module.

* * * * *